Dec. 22, 1931.  R. R. FREEMAN  1,837,857
EGG TURNING DEVICE
Filed Oct. 23, 1929
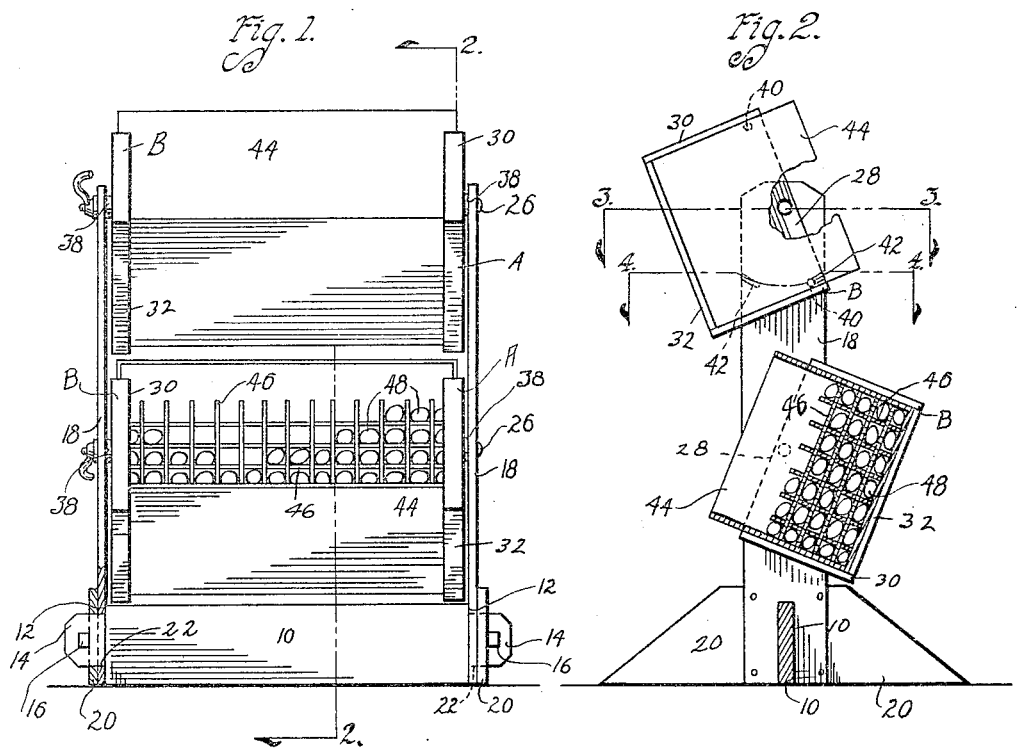
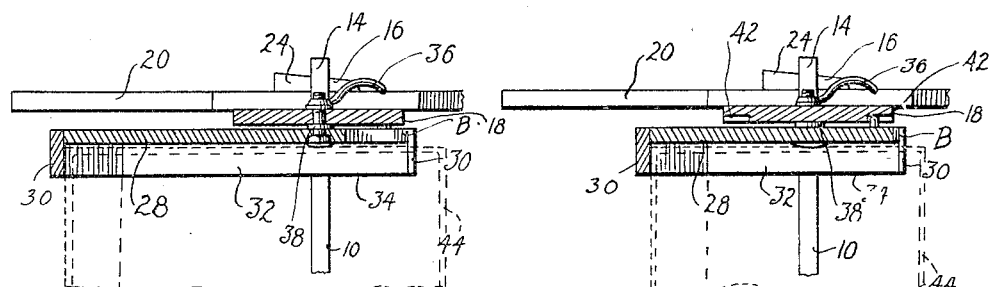
Witness
Carl Bloomburg
Inventor
Rob R. Freeman
by Bair, Freeman & Sinclair
Attorneys Patented Dec. 22, 1931

1,837,857

UNITED STATES PATENT OFFICE

ROB ROY FREEMAN, OF CASCADE, IOWA

EGG TURNING DEVICE

Application filed October 23, 1929. Serial No. 401,688.

The object of my invention is to provide an egg turning device of simple, durable, and comparatively inexpensive construction.

A further object of my invention is to provide a device in the form of a stand adapted to support one or more egg crates which can be tipped to different positions and a novel means for holding the crates rigidly in such tipped positions.

My device is intended primarily for farmers and poultry men who gather eggs for hatcheries. The eggs are ordinarily collected from day to day and placed in an egg crate. In some instances it takes a week or so to fill the crate. In order that the eggs shall remain in the proper condition for the hatchery, it is necessary to change their position daily so that the yolks of the eggs do not settle against the shell which renders the egg unfit for hatching. It is therefore my object to provide a device especially adapted for the purpose of turning the eggs conveniently without handling them individually.

More particularly it is my object to provide a device consisting of a pair of uprights with one or more socket plates pivotally connected with each upright, each socket plate consisting of an end plate, side flanges and a bottom flange and arranged to receive one end of an egg crate by merely sliding the crate downwardly into the socket plates.

Another object is to provide for a pair of opposite socket plates for the ends of an egg crate, a means for holding the crate in any desired position consisting of a clamping bolt extending through one of the socket plates.

Still a further object is to provide the parts of the device of such construction that the device may be shipped in knocked down form and thereby occupy very little space and yet may be easily and quickly assembled by the farmer or other egg collector purchasing the device.

With these and other objects in view my invention consists in the construction, arrangement and combination of the various parts of my device, whereby the objects contemplated are attained, as hereinfter more fully set forth, pointed out in my claims, and illustrated in the accompanying drawings, in which:

Figure 1 is a side elevation of my egg turning device showing a pair of egg crates supported thereby in tipped positions.

Figure 2 is a sectional view on the line 2—2 of Figure 1.

Figure 3 is an enlarged sectional view on the line 3—3 of Figure 2 illustrating a pivotal connection including a clamping bolt.

Figure 4 is a similar sectional view on the line 4—4 of Figure 2 illustrating a stop mechanism to limit the movement of the egg crate.

On the accompanying drawings I have used the reference numeral 10 to indicate a cross member. The cross member 10 is shouldered as indicated at 12 and a tenon 14 is formed on each end. Each tenon 14 is perforated as indicated at 16.

A pair of upright members 18 are provided secured by screws or the like to base members 20. The uprights 18 and base members 20 are mortised as indicated at 22 to receive the tenons 14. Wedges 24 are provided for insertion through the perforations 16 whereby the uprights 18, base members 22 and cross member 10 may be rigidly assembled together. These parts when disassembled may be shipped in a comparatively flat package which is a desirable advantage from a shipping standpoint.

Pivotally connected with one of the uprights 18 by means of a rivet or the like 26 is one or more socket plates A. Each socket plate A consists of an end plate 28, side flanges 30 and a bottom flange 32. Connected with the other upright 18 is one or more socket plates B. The socket plates B are pivotally connected to the upright by clamping bolts 34 and tail nuts 36. The construction of the socket plates B is exactly the same as the socket plates A. Washers 38 are interposed between socket plates and the uprights to prevent rubbing of the outside surfaces of the socket plates against the inside surfaces of the uprights.

Stop pins 40 project from each upper outer edge of each socket plate A and B. Recessed grooves are formed in the upright members 18 for the stop pins 40 to enter and coact with for preventing the socket plates A and B when pivotally moved from rotating a half revolution.

*Operation and use of my device*

In the use of my device, opposite pairs of the socket plates A and B are first aligned with each other in any suitable position and an egg crate 44 is inserted in the socket plates by a downward movement. The ends of the crate 44 are then retained by the flanges 30 and 32, the bottom of the crate resting on the flanges 32. The end plates and crate may now be moved as a unit to a position where one of the stop pins 40 on each end plate engages the bottom of the slots 42 as shown in Figure 2. In this position the various partitions 46 may be inserted and the eggs 48 placed in position as they are collected. The crate is held in the desired position by tightening the tail nut 36.

Every day the egg collector loosens the tail nut 36 and swings the crate 44 to an opposite position (the comparative positions being shown in Figure 2) so that the eggs in the crate are turned nearly half a revolution. This is sufficient to prevent the yolks from settling and rendering the egg unsuitable for hatching purposes. One or more of the crates may be supported on one stand and in the drawings I have illustrated a stand for two crates. The socket plates are spaced one above the other sufficiently far to prevent striking of one crate against another during the rotating movement from one position to the other illustrated in Figure 2.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an egg turning stand, a base, a pair of spaced uprights, and a socket plate pivoted to each upright, each socket plate being adapted to receive an end of an egg case with the egg case forming the sole connecting means between said socket plates.

2. In an egg turning stand, a base, a pair of spaced uprights, and a socket plate pivoted to each upright, each socket plate including an end plate, a bottom flange and a pair of side flanges, the socket plate on one upright being independent of the socket plate on the other one.

3. In an egg turning stand, a base, a pair of spaced uprights, and a socket plate pivoted to each upright, each socket plate being adapted to receive an end of an egg case whereby said egg case forms the sole means of connection between said socket plates the pivotal connection of one of said socket plates with the upright supporting it including a clamping bolt.

4. In an egg turning stand, a base, a pair of spaced uprights, and a socket plate pivoted to each upright, each socket plate being adapted to receive an end of an egg case and coacting stop means on said uprights and said socket plates for preventing said socket plates from rotating a half revolution, said stop means comprising pins permanently secured to the socket plates and adapted to engage the upright.

Des Moines, Iowa, October 14, 1929.

ROB ROY FREEMAN.